(12) United States Patent
Wang et al.

(10) Patent No.: US 11,057,252 B2
(45) Date of Patent: Jul. 6, 2021

(54) COMMON SYNCHRONIZATION SIGNAL FOR SLICED OFDM TRANSMISSION

(71) Applicant: Huawei Technologies Co., Ltd., Shenzhen (CN)

(72) Inventors: Fan Wang, Shanghai (CN); Branislav M. Popovic, Kista (SE); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 16/267,002

(22) Filed: Feb. 4, 2019

(65) Prior Publication Data

US 2019/0245724 A1    Aug. 8, 2019

Related U.S. Application Data

(63) Continuation of application No. PCT/EP2016/069048, filed on Aug. 10, 2016.

(51) Int. Cl.
*H04L 27/26* (2006.01)

(52) U.S. Cl.
CPC ........ *H04L 27/261* (2013.01); *H04L 27/2626* (2013.01); *H04L 27/2627* (2013.01);
(Continued)

(58) Field of Classification Search
CPC .............. H04L 27/261; H04L 27/2626; H04L 27/2627; H04L 27/2666; H04L 27/2673; H04L 27/2675
See application file for complete search history.

(56) References Cited

U.S. PATENT DOCUMENTS 5,923,650 A * 7/1999 Chen ..................... H04L 47/805
                                                  370/331
6,618,452 B1 * 9/2003 Huber ................. H04L 27/2607
                                                  375/343
(Continued)

FOREIGN PATENT DOCUMENTS

CN      101636992 A    1/2010
CN      102299892 A   12/2011
(Continued)

OTHER PUBLICATIONS

U.S. Appl. No. 62/343,826 (Year: 2016).*
(Continued)

*Primary Examiner* — Dung B Huynh
(74) *Attorney, Agent, or Firm* — Leydig, Voit & Mayer, Ltd.

(57) ABSTRACT

A transmitting apparatus for a wireless communication system, where the wireless communication system includes an OFDM based waveform corresponding to a plurality of pre-defined subcarrier spacing values including at least a first subcarrier spacing value $\Delta f_1$ and at least a second subcarrier spacing value $\Delta f_2$. The transmitting apparatus includes a processor and a transmitter where the processor is configured to generate a signal $S_1$ that is a $N_{SF}$ time repetition of an another signal $S_2$. A duration of the another signal $S_2$ is $1/\Delta f_2$, $N_{SF}=\Delta f_2/\Delta f_1$ is an integer greater than 1, and the transmitter is configured to transmit a symbol comprising $S_1$.

16 Claims, 12 Drawing Sheets

(52) U.S. Cl.
CPC ...... *H04L 27/2666* (2013.01); *H04L 27/2673* (2013.01); *H04L 27/2675* (2013.01)

(56) References Cited

U.S. PATENT DOCUMENTS

| | | | | |
|---|---|---|---|---|
| 10,097,393 B1* | 10/2018 | Huang | H04L 27/18 |
| 10,721,775 B2* | 7/2020 | Park | H04W 74/0833 |
| 2003/0043888 A1* | 3/2003 | Kim | H04L 1/0069 | 375/146 |
| 2006/0187887 A1* | 8/2006 | Kim | H04J 13/0044 | 370/335 |
| 2006/0274839 A1* | 12/2006 | Fukuta | H04L 5/0064 | 375/260 |
| 2007/0177732 A1* | 8/2007 | Schotten | H04L 1/0675 | 380/215 |
| 2007/0206558 A1* | 9/2007 | Akita | H04L 5/0037 | 370/344 |
| 2008/0112382 A1* | 5/2008 | Shim | H04B 1/71072 | 370/342 |
| 2008/0186843 A1* | 8/2008 | Ma | H04L 27/2628 | 370/210 |
| 2008/0205351 A1* | 8/2008 | Lindoff | H04L 27/0008 | 370/336 |
| 2009/0069023 A1* | 3/2009 | Ahn | H04L 5/0044 | 455/450 |
| 2009/0083605 A1* | 3/2009 | Miyoshi | H04B 7/15592 | 714/752 |
| 2009/0109955 A1* | 4/2009 | Lakkis | H04B 1/69 | 370/350 |
| 2009/0185602 A1* | 7/2009 | Atarashi | H04J 13/00 | 375/141 |
| 2009/0274233 A1* | 11/2009 | Niu | H04L 27/2676 | 375/267 |
| 2010/0085934 A1* | 4/2010 | Wang | H04L 5/0021 | 370/330 |
| 2010/0254341 A1* | 10/2010 | Sun | H04L 5/0051 | 370/330 |
| 2010/0322065 A1* | 12/2010 | Kang | H04L 27/2618 | 370/210 |
| 2011/0007627 A1* | 1/2011 | Lee | H04L 5/0048 | 370/210 |
| 2011/0007831 A1* | 1/2011 | Moon | H04L 5/0064 | 375/260 |
| 2011/0075707 A1* | 3/2011 | Duan | H04L 5/0044 | 375/144 |
| 2012/0113955 A1* | 5/2012 | Cho | H04W 48/08 | 370/330 |
| 2012/0263124 A1* | 10/2012 | Gaal | H04W 72/048 | 370/329 |
| 2012/0324315 A1* | 12/2012 | Zhang | H04L 1/0043 | 714/776 |
| 2013/0188473 A1 | 7/2013 | Dinan | |
| 2013/0294388 A1* | 11/2013 | Kawasaki | H04L 1/1829 | 370/329 |
| 2014/0269560 A1* | 9/2014 | Jain | H04L 27/2656 | 370/329 |
| 2014/0269843 A1* | 9/2014 | Schaffner | H04N 19/156 | 375/139 |
| 2015/0055616 A1* | 2/2015 | Kim | H04W 56/00 | 370/330 |
| 2015/0282178 A1* | 10/2015 | Kim | H04B 7/2656 | 370/329 |
| 2016/0066321 A1* | 3/2016 | Yu | H04L 27/18 | 370/329 |
| 2016/0080973 A1* | 3/2016 | Tian | H04L 27/261 | 370/230 |
| 2016/0212004 A1* | 7/2016 | Yun | H04L 27/2627 |
| 2016/0227436 A1* | 8/2016 | Vermani | H04L 1/08 |
| 2016/0286506 A1* | 9/2016 | Chae | H04L 5/0051 |
| 2016/0295345 A1* | 10/2016 | Oh | H04W 48/12 |
| 2017/0041911 A1* | 2/2017 | Yamamoto | H04J 13/004 |
| 2017/0094547 A1* | 3/2017 | Yum | H04W 56/001 |
| 2017/0094621 A1* | 3/2017 | Xu | H04L 47/125 |
| 2017/0118055 A1* | 4/2017 | Guey | H04L 5/0094 |
| 2017/0134126 A1* | 5/2017 | Sanderovich | H04L 1/0071 |
| 2017/0142238 A1* | 5/2017 | Gligoroski | H03M 7/00 |
| 2017/0156138 A1* | 6/2017 | Yamamoto | H04L 5/0007 |
| 2017/0164350 A1* | 6/2017 | Sun | H04L 5/0007 |
| 2017/0171865 A1* | 6/2017 | Hwang | H04L 5/00 |
| 2017/0195096 A1* | 7/2017 | Yamamoto | H04L 27/2607 |
| 2017/0245165 A1* | 8/2017 | Onggosanusi | H04L 5/0057 |
| 2017/0303220 A1* | 10/2017 | Sadeghi | H04L 5/0053 |
| 2017/0311315 A1* | 10/2017 | Islam | H04W 72/0446 |
| 2017/0325250 A1* | 11/2017 | Manolakos | H04L 5/0007 |
| 2017/0339697 A1* | 11/2017 | Park | H04L 5/0044 |
| 2017/0353210 A1* | 12/2017 | Pratt | H04B 7/0626 |
| 2017/0359791 A1* | 12/2017 | Onggosanusi | H04L 5/0094 |
| 2017/0367003 A1* | 12/2017 | Zhang | H04W 92/14 |
| 2017/0367120 A1* | 12/2017 | Murray | H04W 72/046 |
| 2018/0091249 A1* | 3/2018 | Han | H04L 5/0094 |
| 2018/0132280 A1* | 5/2018 | Lee | H04L 27/2692 |
| 2018/0146465 A1* | 5/2018 | Li | H04L 5/0053 |
| 2018/0146498 A1* | 5/2018 | Sahlin | H04W 56/0045 |
| 2018/0241508 A1* | 8/2018 | Chervyakov | H04L 27/2675 |
| 2018/0255586 A1* | 9/2018 | Einhaus | H04W 72/0413 |
| 2018/0270093 A1* | 9/2018 | Lopez | H04L 5/0028 |
| 2018/0367285 A1* | 12/2018 | Yi | H04L 1/18 |
| 2019/0007152 A1* | 1/2019 | Yi | H04L 5/0028 |
| 2019/0044690 A1* | 2/2019 | Yi | H04W 72/0446 |
| 2019/0058558 A1* | 2/2019 | Lee | H04L 5/0083 |
| 2019/0075006 A1* | 3/2019 | Yi | H04L 27/2602 |
| 2019/0098608 A1* | 3/2019 | Yi | H04L 5/0044 |
| 2019/0109695 A1* | 4/2019 | Kim | H04L 27/2613 |
| 2019/0116007 A1* | 4/2019 | Yi | H04W 56/00 |
| 2019/0132173 A1* | 5/2019 | Gao | H04L 1/1607 |
| 2019/0150132 A1* | 5/2019 | Bala | H04W 72/042 | 370/329 |
| 2020/0015177 A1* | 1/2020 | Kim | H04L 27/2602 |

FOREIGN PATENT DOCUMENTS

CN 102740375 A 10/2012
KR 20100003770 A 1/2010

OTHER PUBLICATIONS

U.S. Appl. No. 62/325,726 (Year: 2016).*
U.S. Appl. No. 62/339,647 (Year: 2016).*
Huawei et al., "A common synchronization signal for a NR carrier supporting different numerologies", 3GPP TSG RAN WG1 Meeting #86, R1-167217, Gothenburg, Sweden, 7 pages (Aug. 22-26, 2016).
3GPP TS 36.211 V8.9.0 (Dec. 2009), 3rd Generation Partnership Project; Technical Specification Group Radio Access Network; Evolved Universal Terrestrial Radio Access (E-UTRA); Physical Channels and Modulation (Release 8), 83 pages (2009).
3GPP TS 36.211 V13.2.0 (Jun. 2016), 3rd Generation Partnership Project;Technical Specification Group Radio Access Network; Evolved Universal Terrestrial Radio Access (E-UTRA); Physical channels and modulation (Release 13), 168 pages (2016).

* cited by examiner

COMMON SYNCHRONIZATION SIGNAL FOR SLICED OFDM TRANSMISSION

CROSS-REFERENCE TO RELATED APPLICATIONS

This application is a continuation of International Application No. PCT/EP2016/069048, filed on Aug. 10, 2016, the disclosure of which is hereby incorporated by reference in its entirety.

TECHNICAL FIELD

The aspects of the present disclosure relate generally to wireless communication systems and more particularly to new radio (NR) access technology wireless communication systems.

BACKGROUND

A fundamental procedure in a cellular wireless communication system is synchronization. Synchronization is performed by a mobile terminal for obtaining time and frequency synchronization to a cell in the network and detecting its cell identity. In Long Term Evolution (LTE), the synchronization signal is always transmitted in a carrier with fixed subcarrier spacing. This fixed carrier spacing, i.e. 15 KHz, is known by both the user equipment (UE) and the network or transmitting node prior to the synchronization procedure.

The 3rd Generation Partnership Project (3GPP) is currently working on a New Radio (NR) access technology. To address various scenarios and requirements, NR may support multiple numerologies via scalable numerology or mixed numerology using Orthogonal Frequency Division Multiplexing (OFDM) based waveforms. An OFDM based waveform could be OFDM, or precoded OFDM like Discrete Fourier Transform-spread-OFDM ((DFT-s-OFDM), or Single Carrier Frequency Division Multiple Access (SC-FDMA), or any other OFDM variants based on OFDM.

One major change of NR to LTE in terms of synchronization is that the carrier or sub-band containing the synchronization signal is not always a fixed spacing value. The actually used subcarrier spacing at the network side may not be known by the UE prior to the synchronization procedure. It is therefore an issue to provide a synchronization signal which can be transmitted on a NR carrier capable of multiple subcarrier spacing values, while providing efficient and low-complexity UE synchronization operation.

Accordingly, it would be desirable to be able to provide a synchronization signal transceiving scheme for initial access in a new radio cellular system in a manner that addresses at least some of the problems identified above.

SUMMARY

It is an object of the disclosure to provide an efficient synchronization signal transceiving scheme for initial access in a new radio type cellular communication system using an OFDM based waveform. This object is solved by the subject matter of the independent claims. Further advantageous modifications can be found in the dependent claims.

According to a first aspect of the disclosure the above and further objects and advantages are obtained by a transmitting apparatus for a wireless communication system using an OFDM based waveform corresponding to a plurality of pre-defined subcarrier spacing values comprising at least a first subcarrier spacing value $\Delta f_1$ and at least a second subcarrier spacing value $\Delta f_2$. An OFDM based waveform includes a plurality of subcarriers with a subcarrier spacing. The term "corresponding to" as used herein generally means that any value of a plurality of pre-defined subcarrier spacing values is supported or can be used in the wireless communication system. In one embodiment the transmitting apparatus includes a processor and a transmitter, wherein the processor is configured to generate a signal $S_1$ comprising a $N_{SF}$ time repetition of an another signal $S_2$, wherein a duration of the another signal $S_2$ is $1/\Delta f_2$, and $N_{SF}=\Delta f_2/\Delta f_1$ is an integer greater than 1; and wherein the transmitter (114) is configured to transmit a symbol comprising $S_1$. The aspects of the disclosed embodiments provide a signal that can be transmitted on a new radio carrier capable of multiple subcarrier spacing values, while providing efficient and low-complexity user equipment detection operation.

In a first possible implementation form of the transmitting apparatus according to the first aspect the processor is further configured to derive a subcarrier spacing value from a plurality of pre-defined subcarrier spacing values comprising at least the first subcarrier spacing value $\Delta f_1$ and at least the second subcarrier spacing value $\Delta f_2$ as the first subcarrier spacing value $\Delta f_1$, or the second subcarrier spacing value $\Delta f_2$, or a third subcarrier spacing value $\Delta f_3$ for transmission using the OFDM based waveform. The aspects of the disclosed embodiments enable the signal to be multiplexed with other signals/channels using a single OFDM-based waveform generation, resulting in reduced complexity, while also supporting more than two subcarrier spacing values.

In a second possible implementation form of the transmitting apparatus according to the first possible implementation form of the first aspect a duration of the signal $S_1$ is $1/\Delta f_1$. The aspects of the disclosed embodiments enable the signal to be generated by mapping a frequency domain signal sequence to resource elements using the first subcarrier spacing value $\Delta f_1$.

In a third possible implementation form of the transmitting apparatus according to the first or second possible implementation forms of the first aspect as such the second subcarrier spacing $\Delta f_2$ is a largest value of the plurality of subcarrier spacing values. The aspects of the disclosed embodiments enable the signal to be generated by mapping a frequency domain signal sequence to resource elements using more than two subcarrier spacing values.

In a fourth possible implementation form of the transmitting apparatus according to the first aspect as such or according to any of the first through third possible implementation the $N_{SF}$ time repetition of the signal $S_2$ is a time continuous repetition of the signal $S_2$. The aspects of the disclosed embodiment enable the receiving apparatus to process a same and continuous time domain signal across different subcarrier spacings.

In a fifth possible implementation form of the transmitting apparatus according to the first aspect as such or according to any one of the first through fourth possible implementation forms the $N_{SF}$ time repetition of the signal $S_2$ is a time discontinuous repetition with a cyclic prefix between the signal $S_2$ and a repetition of the signal $S_2$. Different time domain repetitions for different subcarrier spacing values enable the receiving apparatus or user equipment to detect the subcarrier spacing.

In a first possible implementation form of the transmitting apparatus according to the fifth possible implementation form of the first aspect as such the processor is configured to generate the signal $S_1$ with the cyclic prefix, or the cyclic prefix and a cyclic postfix. Different useful OFDM symbol positions enables the receiver apparatus or user equipment to detect the subcarrier spacing.

In a sixth possible implementation form of the transmitting apparatus according to the first aspect as such or according to any one of the preceding implementation forms, the processor is configured to generate the signal $S_2$ by mapping a synchronization signal sequence to a plurality of frequency continuously indexed resource elements corresponding to $\Delta f_2$. Using the same synchronization signal sequence for different subcarrier spacing values simplifies both the transmitting apparatus and the receiving apparatus. It also allows the transmitter to generate the synchronization signal by mapping a synchronization signal sequence to resource elements corresponding to $\Delta f_2$.

In a seventh possible implementation form of the transmitting apparatus according to the first aspect as such or according to any one of the preceding possible implementation forms the processor is configured to generate the signal $S_1$ by mapping a synchronization signal sequence to a resource element corresponding to $\Delta f_1$, wherein one synchronization signal sequence element is mapped to one resource element of $N_{SF}$ resource elements. Using the same synchronization signal sequence for different subcarrier spacing values simplifies both the transmitting apparatus and the receiving apparatus. It also allows the transmitter to generate the synchronization signal by mapping a synchronization signal sequence to resource elements corresponding to $\Delta f_2$.

In a first possible implementation form of the seventh possible implementation form of the transmitter apparatus according to the first aspect as such the processor is configured to map two elements of the synchronization signal sequence to two resource elements frequency indexed by $\{k\}$, $\{k+2N_{SF}-1\}$, where k is an integer. The specific mapping from synchronization signal sequence to resource elements provides a time domain repetitive waveform based on OFDM.

In an eighth possible implementation form of the transmitting apparatus according to the first aspect as such or according to any one of the preceding possible implementation forms the processor is configured to generate the signal Si within a subband in a carrier for synchronization, wherein there are a plurality of subbands in the carrier and each subband corresponds to a signal $S_1$. This allows the receiving apparatus to operate with a specific subband bandwidth rather than the entire downlink bandwidth.

In a ninth possible implementation form of the transmitting apparatus according to the first aspect as such or according to any one of the preceding possible implementation forms the processor is configured to generate a signal $S_3$ by mapping a length-L synchronization signal sequence to resource elements corresponding to $\Delta f_1$ with at least $(N_{SF}-1)L$ resource elements reserved, where L is a positive integer. The localized mapping helps a LTE-like synchronization receiver to be reused, while the reserved resource elements further allow the receiver to work with a common low pass filter regardless of the subcarrier spacing used by the transmitter.

In a tenth possible implementation form of the transmitting apparatus according to the first aspect as such or according to any one of the preceding possible implementation forms the signal $S_1$ is for synchronization. The aspects of the disclosed embodiments provide a synchronization signal for a synchronization procedure that can be transmitted on a carrier using different subcarrier spacing values and where the subcarrier spacing values used at the transmitting apparatus are not known to the receiving apparatus.

In an eleventh possible implementation form of the transmitting apparatus according to the first aspect as such or according to any one of the preceding possible implementation forms the processor is configured to generate the signal $S_1$ if the at least one subcarrier spacing value comprises $\Delta f_2$ and generate the signal $S_3$ if the at least one subcarrier spacing value comprises $\Delta f_1$. The time domain waveform is subcarrier spacing value specific and therefore allows for the subcarrier spacing value to be detected. In addition, the receiver can share a common low pass filter, while potentially use an LTE compatible baseband processor, e.g. matched filter, for detecting $S_3$.

According to a second aspect of the disclosure the above and further objects and advantages are obtained by a receiving apparatus for a wireless communication system including an OFDM based waveform corresponding to a plurality of pre-defined subcarrier spacing values comprising at least a first subcarrier spacing value $\Delta f_1$ and at least a second subcarrier spacing value $\Delta f_2$, the receiving apparatus including a processor and a receiver wherein the receiver is configured to receive a symbol comprising a signal and wherein the processor is configured to detect a signal $S_1$ comprising a $N_{SF}$ time repetition of a signal $S_2$ from the symbol, wherein a duration of the signal $S_2$ is $1/\Delta f_1$, and $N_{SF}=\Delta f_2/\Delta f_1$ is an integer greater than 1. The aspects of the disclosed embodiments allow the receiving apparatus to share a common low pass filter and common baseband processor regardless of the subcarrier spacing used at the transmitting apparatus.

In a first possible implementation form of the receiving apparatus according to the second aspect as such the signal $S_1$ is for synchronization and the processor derives synchronization information from detecting the signal $S_1$. The aspects of the disclosed embodiments allow the receiving apparatus to detect synchronization information using the knowledge that the signal is time repetitive.

In a second possible implementation form of the receiving apparatus according to the first possible implementation form of the second aspect the processor derives the at least one subcarrier spacing value from detecting the signal $S_1$. The aspects of the disclosed embodiments allow the receiving apparatus to detect the subcarrier spacing value from the time domain signal, which simplifies the receiving apparatus implementation.

According to a third aspect of the disclosure the above and further objects and advantages are obtained by a method in a transmitting device of a wireless communication system including an OFDM based waveform comprising at least a first subcarrier spacing value $\Delta f_1$ and a second subcarrier spacing value $\Delta f_2$, the method comprising generating a signal $S_1$ comprising a $N_{SF}$ time repetition of an another signal $S_2$, wherein a duration of the another signal $S_2$ is $1/\Delta f_2$, $N_{SF}=\Delta f_2/\Delta f_1$ is an integer greater than 1; and transmitting a symbol comprising $S_1$. The aspects of the disclosed method provides a synchronization signal that can be transmitted on a new radio carrier capable of multiple subcarrier spacing values, while providing efficient and low-complexity user equipment synchronization operation.

According to a fourth aspect of the disclosure the above and further objects and advantages are obtained by a method in a receiving apparatus for a wireless communication system including an OFDM based waveform corresponding to a plurality of pre-defined subcarrier spacing values comprising at least a first subcarrier spacing value $\Delta f_1$ and at least a second subcarrier spacing value $\Delta f_2$, the method comprising receiving a symbol; and detecting a signal $S_1$ comprising a $N_{SF}$ time repetition of a signal $S_2$ from the symbol, wherein a duration of the signal $S_2$ is $1/\Delta f_1$, and $N_{SF}=\Delta f_2/\Delta f_1$ is an integer greater than 1. The aspects of the disclosed method allows the receiving apparatus to share a common low pass filter and common baseband processor regardless of the subcarrier spacing used at the transmitting apparatus.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
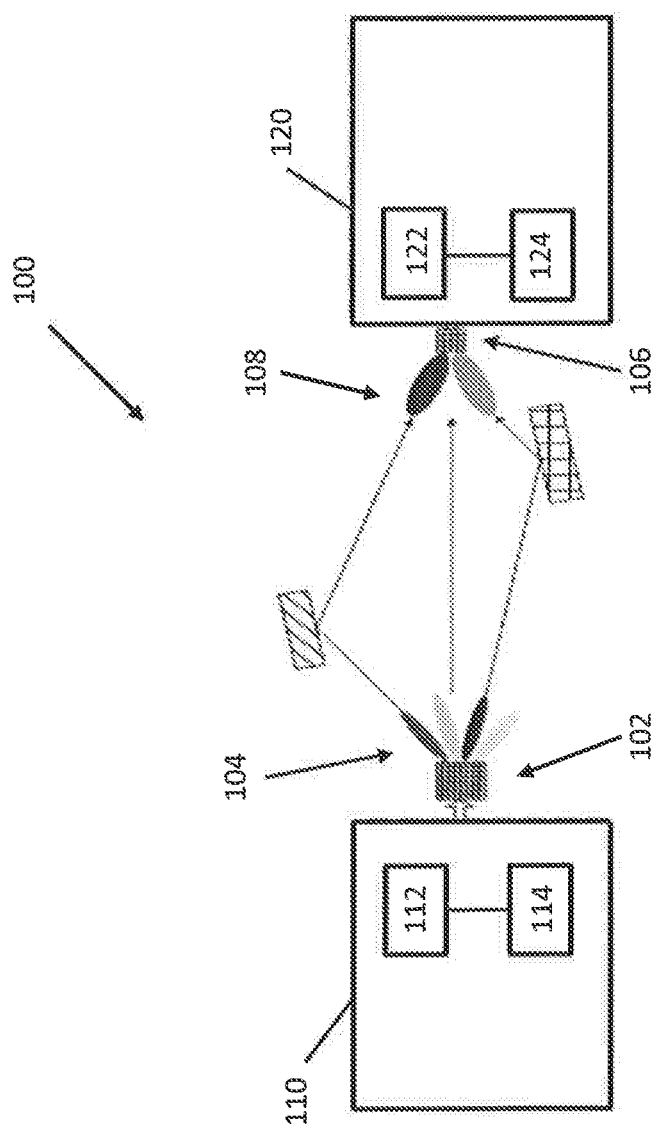
FIG. 1 is a block diagram illustrating an exemplary wireless communication system incorporating aspects of the disclosed embodiments.

Referring to FIG. 1 there can be seen an exemplary block diagram of wireless communication system 100 incorporating aspects of the disclosed embodiments. The aspects of the disclosed embodiments are directed to providing a synchronization signal transceiving scheme for initial access in a new radio cellular system capable of multiple subcarrier spacing values. The common synchronization signal $S_1$ has the same bandwidth occupancy and time occupancy for a same length synchronization signal sequence for a carrier operating with different subcarrier spacing values, where the different subcarrier spacing values include at least a first or small subcarrier spacing value $\Delta f_1$ and a second or large subcarrier spacing value $\Delta f_2$.

As is illustrated in FIG. 1, the wireless communication system 100 includes at least one transmitting apparatus 110 and at least one receiver apparatus 120. The wireless communication system 100 can be any suitable type of wireless communication system, such as for example, LTE, 5G or NR. In one embodiment, the transmitting apparatus 110 can comprise or include a network node such as an Evolved Universal Terrestrial Radio Access Network (E-UTRAN) NodeB or evolved NodeB (eNB), or a user node or equipment (UE) such as a mobile communication device. The receiving apparatus 120 can comprise or include a user node or equipment (UE) such as a mobile communication device, or a network node such as an (E-UTRAN) NodeB or evolved NodeB (eNB), or UE such as a mobile communication device, for example.

In the example of FIG. 1, the transmitting apparatus 110 includes at least one processor 112 and at least one transmitter or transceiver device 114. While the processor 112 and transceiver 114 are shown in FIG. 1 as being separate devices, in alternate embodiments, the processor 112 and transceiver device 114 can comprises a single device. The transmitting apparatus 110 can include any suitable number of processors 112 and transceivers 114, depending upon the particular application and implementation.

The transmitting apparatus 110 can also include one or more antennas or antenna arrays 102. The antennas or antenna arrays 102 will be generally configured to generate one or more directional beams, generally referred to herein as directional beams 104.

The receiver or receiving apparatus 120 generally includes a receiver or transceiver 122 and a processor 124. Although the transceiver 122 and processor 124 are shown in the example of FIG. 1 as separate devices, in alternate embodiments, the transceiver 122 and processor 124 can comprise a single device or unit.

The receiving apparatus 120 will also include one or more antennas or antenna arrays 106. The antennas 106 are configured to generate one or more receiving beam patterns 108, to receive, among other things, the signals transmitted from the transmitting apparatus 110.

The wireless communication system 100 includes an OFDM based waveform corresponding to a plurality of pre-defined subcarrier spacing values comprising at least a first subcarrier spacing value $\Delta f_1$ and at least a second subcarrier spacing value $\Delta f_2$. An OFDM waveform comprises a plurality of subcarriers. Any value of the plurality of pre-defined subcarrier values is supported or can be used in the wireless communication system (100). The term "corresponding to" as used herein generally means that any value of a plurality of pre-defined subcarrier spacing values is supported or can be used in the wireless communication system. The first subcarrier spacing value $\Delta f_1$ can be referred to as a small or basic subcarrier spacing value. The second subcarrier spacing value $\Delta f_2$ can referred to as a large or scaled subcarrier spacing value.

The processor 112 is configured to generate a synchronization signal $S_1$ that has a $N_{SF}$ time repetition property of another signal $S_2$. In one embodiment, the synchronization signal $S_1$ is the same in terms of the frequency domain occupancy and the time domain signal as is further described below with respect to equation 4a and 4b. The signal $S_2$ has a duration of $1/\Delta_2$. The time domain waveform of the synchronization signal $S_1$ is a $N_{SF}=\Delta f_2/\Delta f_1$, repetition of a basic waveform $S_2$, referred to herein as the another signal $S_2$, where $N_{SF}$ is an integer greater than 1.

The processor 112 is configured to generate an OFDM symbol comprising the synchronization signal $S_1$. The transmitter 114 is configured to transmit the OFDM symbol comprising $S_1$.

Figure 2:
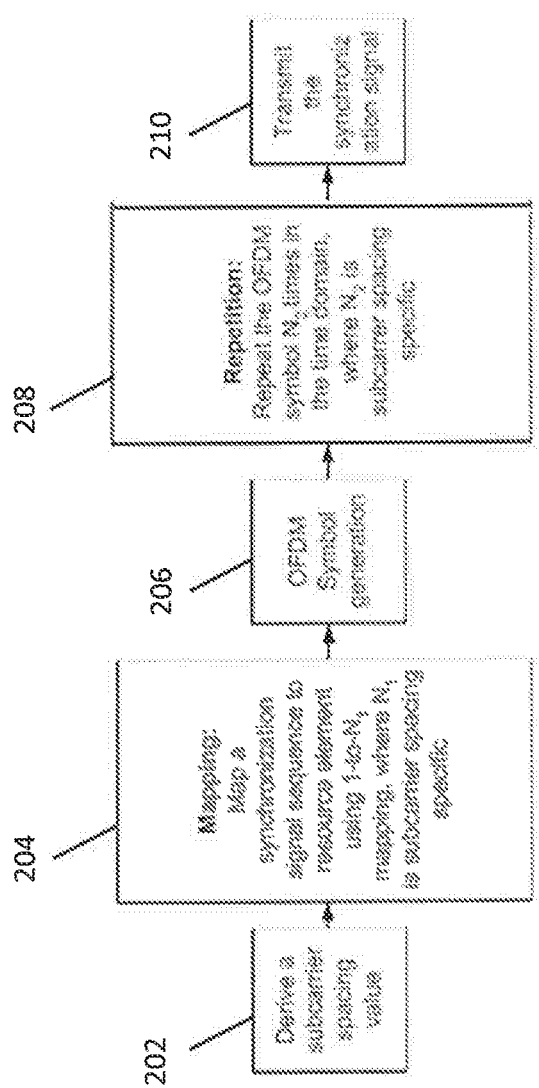
FIG. 2 illustrates a block diagram of an exemplary process flow in a transmitter apparatus incorporating aspects of the disclosed embodiments.

FIG. 2 generally illustrates one example of an operation at the transmitting apparatus 110 to generate the synchronization signal $S_1$ with a given time domain repetition property $N_{SF}$ in accordance with the aspects of the disclosed embodiments. In one embodiment, the processor 112 is configured to derive 202 at least one subcarrier spacing value from the plurality of subcarrier spacing values that includes at least the first subcarrier spacing value $\Delta f_1$ and at least the second subcarrier spacing value $\Delta f_2$. For example, the transmitting apparatus 110 may select, e.g. in a pre-determined way, or in a dynamic manner, or by any implementation, at least one value from a plurality of subcarrier spacing values supported in the wireless communication system 100. The subcarrier spacing value is used to generate a symbol based on OFDM waveform, e.g. OFDM, DFT-s-OFDM, SC-FDMA or other OFDM variants. A synchronization signal sequence is mapped 204 to a resource element (e.g. an element in the resource grid as defined in 3GPP TS36.211) using a 1-to-$N_1$ mapping, where $N_1$ is subcarrier spacing specific and a function of the derived subcarrier spacing value $\Delta f$, $\Delta f_1$ or $\Delta f_2$. In one example, $N_1=\Delta f/\Delta f_1$. This generates $N_1$ repetitions in the time domain, as explained below with respect to Equations 4a and 4b.

An OFDM symbol is generated 206. The OFDM symbol is repeated 208, $N_2$ times in the time domain, where $N_2$ is subcarrier spacing specific and $N_1 \times N_2=N_{SF}$. This in total generates $N_{SF}$ repetitions of the another signal $S_2$ in the time domain. It should be noted that the repetition step is not always needed, because repetition can be understood as not performed when $N_2=1$. A symbol comprising the synchronization signal $S_1$ is transmitted 210.

The aspects of the disclosed embodiments are directed to generating a common/same time domain synchronization signal Si based on a same synchronization sequence using different subcarrier spacing values. The term "common" as referred to herein with respect to the synchronization signal $S_1$ generally means that the signal $S_1$ is the same regardless of the subcarrier frequency that is actually used.

In the following description, the LTE Orthogonal Frequency Division Multiple Access (OFDMA) waveform is considered using a 15 KHz subcarrier spacing, together with an LTE length-62 Primary Synchronization Signal (PSS) sequence. While 15 KHz and 30 KHz subcarrier spacing's are generally referred to herein, it shall be understood the aspects of the disclosed embodiments can be extended to any other suitable subcarrier spacing values and any other length synchronization signal sequences. The aspects of the disclosed embodiments can be applicable to an OFDM based waveform, which can be any variants of an OFDMA waveform, such as for example, but not limited to pre-coded Orthogonal Frequency Division Multiplexing (OFDM) waveforms and Single Carrier Frequency Division Multiple Access (SC-FDMA) waveforms. The aspects of the disclosed embodiments can also be implemented in downlink, uplink and sidelink communication schemes. For example, the synchronization signal sequence can be a downlink/sidelink synchronization sequence, or an uplink Physical Random Access Channel (PRACH) preamble sequence.

The OFDM waveform without a cyclic prefix can be defined by:

$$s(t) = \sum_{k=-\lfloor N_{RB}^{DL} N_{sc}^{RB}/2 \rfloor}^{-1} a_k \cdot e^{j2\pi k\Delta ft} + \sum_{k=1}^{\lceil N_{RB}^{DL} N_{sc}^{RB}/2 \rceil} a_k \cdot e^{j2\pi k\Delta ft}$$

for $0 \le t < N \times T_s$, where $\Delta f=15$ KHz, N is 2048, $T_s=1/f_s$ and $f_s=N \times \Delta f$ according to the LTE standard. Hence it is possible to define:

$$H[k] = \begin{cases} a_k, & -\lfloor N_{RB}^{DL} N_{sc}^{RB}/2 \rfloor \le k \le \left\lceil \frac{N_{RB}^{DL} N_{sc}^{RB}}{2} \right\rceil \cap k \ne 0 \\ 0, & \text{elsewhere} \end{cases}$$

$$s(t) = \sum_{k=-\lfloor N/2 \rfloor}^{\lfloor N/2 \rfloor} H[k] \cdot e^{j2\pi k\Delta ft}.$$

and

The sampled version by setting $t=n/f_s$ is:

$$s[n] = \frac{1}{\sqrt{N}} \sum_{k=-\lfloor N/2 \rfloor}^{\lceil N/2 \rceil} H[k] e^{\frac{j2\pi nk}{N}}$$

for n=0,1, . . . , N−1 where H [k] is a Fourier coefficient at frequency k.

The LTE PSS sequence is given by:

$$d_u(m) = \begin{cases} e^{-j\frac{\pi um(m+1)}{63}} & m = 0, 1, \ldots, 30 \\ e^{-j\frac{\pi um(m+1)(m+2)}{63}} & m = 31, 32, \ldots, 61 \end{cases}$$

where u is the Zadoff-Chu root sequence index.

The mapping for Frequency Division Duplexing (FDD) (Frame Structure 1) is as specified in 3GPP TS36.211:

$$a_k = d(m), \quad m = 0, \ldots, 61$$

$$k = m - 31 + \frac{N_{RB}^{DL} N_{sc}^{RB}}{2}$$

The sampled signal is:

$$s[n] = \frac{1}{\sqrt{N}} \sum_{k=-\lfloor N/2 \rfloor}^{\lceil N/2 \rceil} H[k]e^{\frac{j2\pi nk}{N}} =$$

$$\frac{1}{\sqrt{N}} \left( \sum_{m=31}^{61} d(m)e^{\frac{j2\pi n(m-30)}{N}} + \sum_{m=0}^{30} d(m)e^{\frac{j2\pi n(m-31)}{N}} \right).$$

Figure 3:
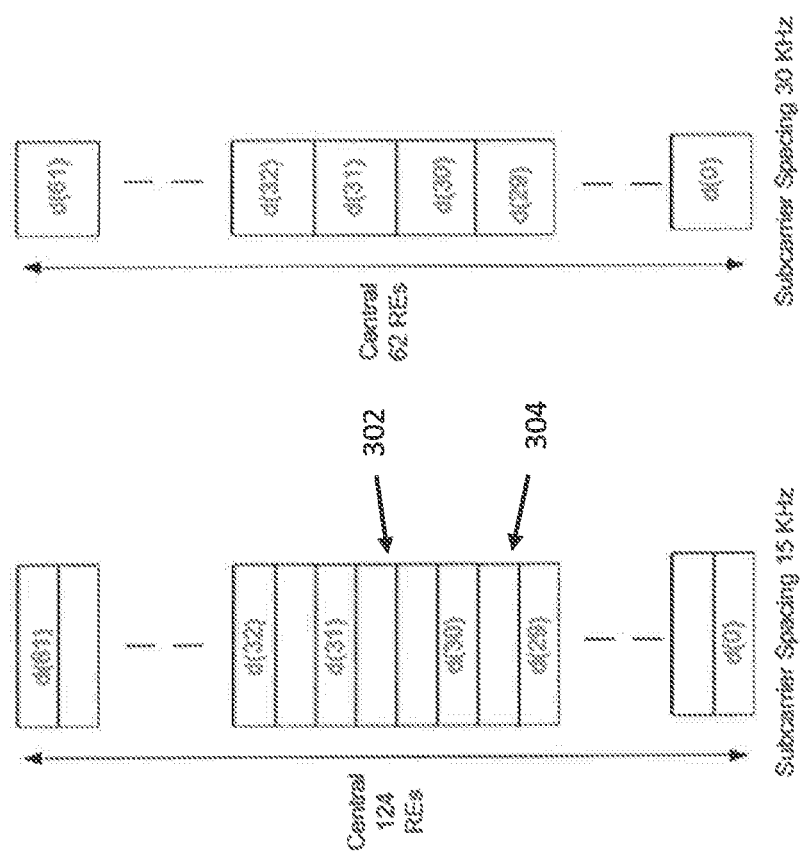
FIGS. 3A and 3B illustrate schematic diagrams of exemplary frequency domain mapping for different subcarrier spacing values in a system incorporating aspects of the disclosed embodiments.

One example of frequency domain mapping for a NR carrier supporting multiple subcarrier spacing values is shown in FIGS. 3A and 3B. The DC subcarrier is not shown in FIG. 3A and 3B. In the example of FIG. 3A, the subcarrier spacing value is 15 KHz and the mapping represents a 1-to-2 resource element (RE) mapping. In the example of FIG. 3B, the subcarrier spacing value is 30 KHz and represents a 1-to-1 RE mapping.

A typical synchronization sequence uses 62 subcarriers in total, with 31 subcarriers mapped on each side of the DC subcarrier, which is not used. In the example of FIG. 3A, in order to generate a time repetition signal for a small subcarrier spacing value $\Delta f_1$, e.g. 15 KHz, the length-62 PSS sequence is mapped to every other resource element, where each resource element is referenced as $d(0)$ to $d(61)$. In the example of FIG. 3B, for a large subcarrier spacing value $\Delta f_2$, e.g. 30 KHz, the length-62 PSS sequence is mapped to every resource element, where each resource element is referenced as $d(0)$ to $d(61)$.

The 1-to-2 RE mapping of the length-62 PSS sequence illustrated in the example of FIG. 3A is given by:

$$a_k = d(m), \quad m = 0, \ldots, 61 \quad (1)$$

$$k = \begin{cases} 2m - 62 + \frac{N_{RB}^{DL} N_{sc}^{RB}}{2}, & m = 0, \ldots, 30 \\ 2m - 60 + \frac{N_{RB}^{DL} N_{sc}^{RB}}{2}, & m = 31, \ldots, 61 \end{cases}$$

The sampled version is therefore given by:

$$s[n] = \frac{1}{\sqrt{N}} \sum_{k=-\lfloor N/2 \rfloor}^{\lceil N/2 \rceil} H[k]e^{\frac{j2\pi nk}{N}} = \quad (2)$$

$$\frac{1}{\sqrt{N}} \left( \sum_{m=31}^{61} d(m)e^{\frac{j2\pi n(2m-60)}{N}} + \sum_{m=0}^{30} d(m)e^{\frac{j2\pi n(2m-62)}{N}} \right),$$

It can be further shown that:

$$s\left[n + \frac{N}{2}\right] = \frac{1}{\sqrt{N}} \sum_{k=-\lfloor \frac{N}{2} \rfloor}^{\lceil \frac{N}{2} \rceil} H[k]e^{\frac{j2\pi (n+\frac{N}{2})k}{N}} = \quad (3)$$

$$\frac{1}{\sqrt{N}} \left( \sum_{m=31}^{61} d(m)e^{\frac{j2\pi (n+\frac{N}{2})(2m-60)}{N}} + \sum_{m=0}^{30} d(m)e^{\frac{j2\pi (n+\frac{N}{2})(2m-62)}{N}} \right) =$$

$$\frac{1}{\sqrt{N}} \left( \sum_{m=31}^{61} d(m)e^{\frac{j2\pi (n+\frac{N}{2})(2m-60)}{N}} + \sum_{m=0}^{30} d(m)e^{\frac{j2\pi (n+\frac{N}{2})(2m-62)}{N}} \right) = s[n],$$

$$n = 0, 1, \ldots, N-1$$

The above demonstrates that for a subcarrier spacing of 15 KHz, for a length-62 PSS sequence, there is a two time repetition by a 1-to-2 mapping, i.e. by mapping the length-62 PSS sequence to every other resource element, or 1 resource element in every 2 resource elements, as is shown in FIG. 3A. Similar observations hold for 1 to X mapping, i.e. there are X time repetitions in time domain. The time repetition factor X is given by $N_{SF} = \Delta f_2 / \Delta f_1$. The $N_{SF}$ time repetition waveform satisfies at least one of the following in the discrete form and the continuous form:

$$s\left[n + \frac{qN}{N_{SF}}\right] = s[n], n = 0, 1, \ldots, \lfloor N/N_{SF} \rfloor - 1, \quad (4a)$$

$$q = 0, 1, \ldots, N_{SF} - 1$$

$$s(t + qT_{S2}) = s(t), 0 \le t \le T_{S2}, q = 0, 1, \ldots, N_{SF} - 1 \quad (4b)$$

where $T_{S2} = 1/\Delta f_2$ corresponds to the OFDM symbol duration with subcarrier spacing of $\Delta f_2$, N is an positive integer, e.g. the FFT size.

In the example of FIG. 3B, the subcarrier spacing value is 30 KHz. For a large subcarrier spacing value, e.g. 30 KHz, the length-62 PSS sequence is mapped to every resource element $d(0)-d(61)$. The resulting signal is given by:

$$s[n] = \frac{1}{\sqrt{\frac{N}{2}}} \sum_{k=-\lfloor N/4 \rfloor}^{\lceil N/4 \rceil} H[k]e^{\frac{j2\pi nk}{\frac{N}{2}}} = \quad (5)$$

$$\frac{1}{\sqrt{\frac{N}{2}}} \left( \sum_{m=31}^{61} d(m)e^{\frac{j2\pi n(m-30)}{\frac{N}{2}}} + \sum_{m=0}^{30} d(m)e^{\frac{j2\pi n(m-31)}{\frac{N}{2}}} \right) =$$

$$\frac{1}{\sqrt{\frac{N}{2}}} \left( \sum_{m=31}^{61} d(m)e^{\frac{j2\pi n(2m-60)}{N}} + \sum_{m=0}^{30} d(m)e^{\frac{j2\pi n(2m-62)}{N}} \right),$$

$$n = 0, 1, \ldots, N/2 - 1$$

The above demonstrates that the resulting signal from equation (5) is the same as the signal from equation (3) without considering the normalization value, where the difference is that the signal from equation (3) is a two time repetition of the signal from equation (5). This is further illustrated by the graph in FIG. 4.

Figure 4:
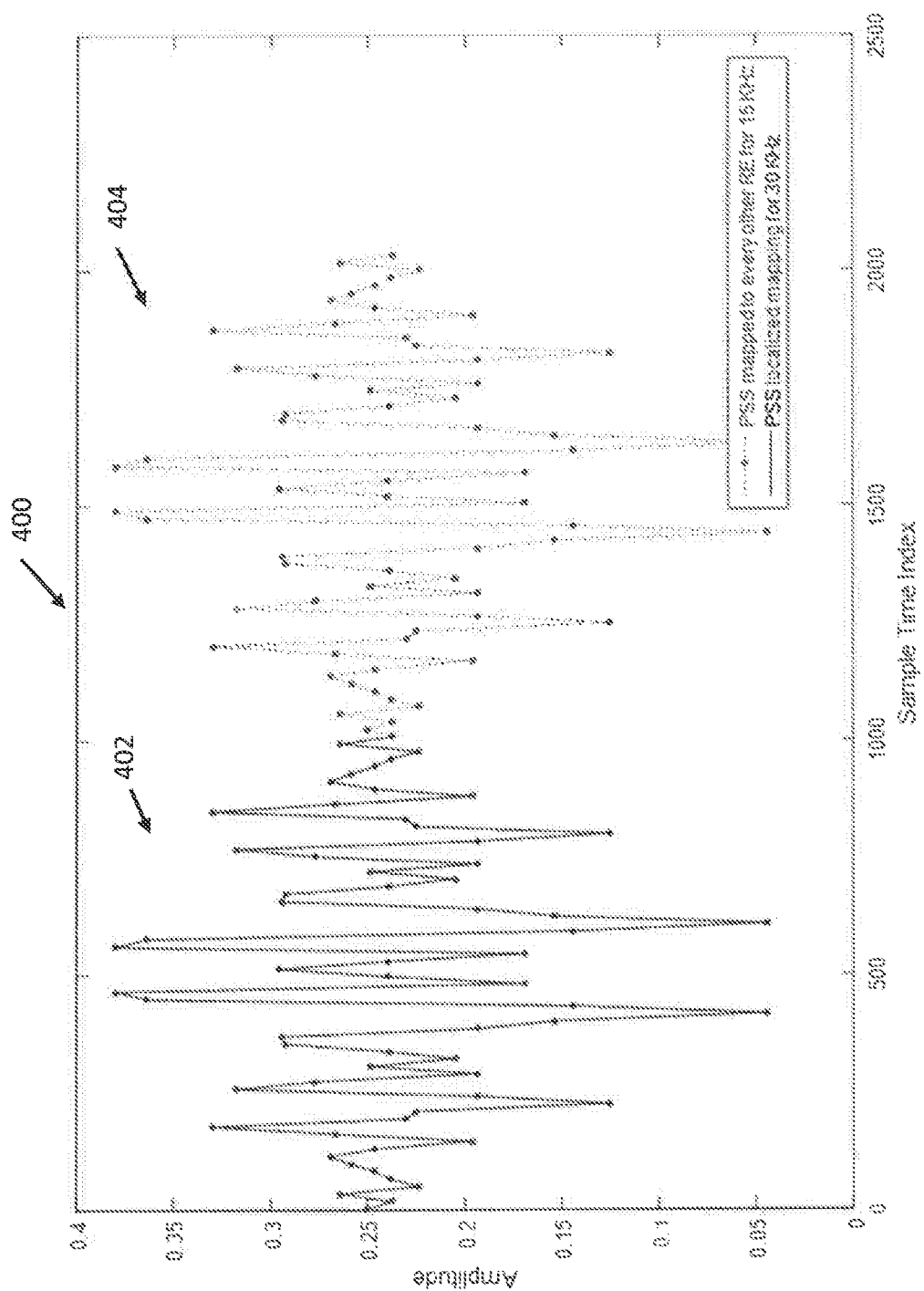
FIG. 4 illustrates a graph of exemplary time domain signal mapping in a system incorporating aspects of the disclosed embodiments.

The graph shown in FIG. 4 represents a time domain signal 400 that is the result of the mapping of a PSS sequence to every other resource element for 15 KHz subcarrier spacing and mapping a PSS sequence in a localized or contiguous manner for a 30 KHz subcarrier spacing. The portion 402 of the time domain signal 400 represents the length 62-PSS mapped to every resource element (1:1 RE mapping) for a subcarrier spacing of 30 KHz. The portion 404 of the time domain signal 400 represents the length-62 PSS mapped to every other resource element (1:2 RE mapping) for a subcarrier spacing of 15 KHz, which is a two time repetition of the mapping of the same length 62-PSS to every resource element for 30 KHz subcarrier spacing. As is illustrated in the example of FIG. 4, the time domain signal of the portion 402 and the portion 404 of the time domain signal 400 are substantially the same.

Figure 5:
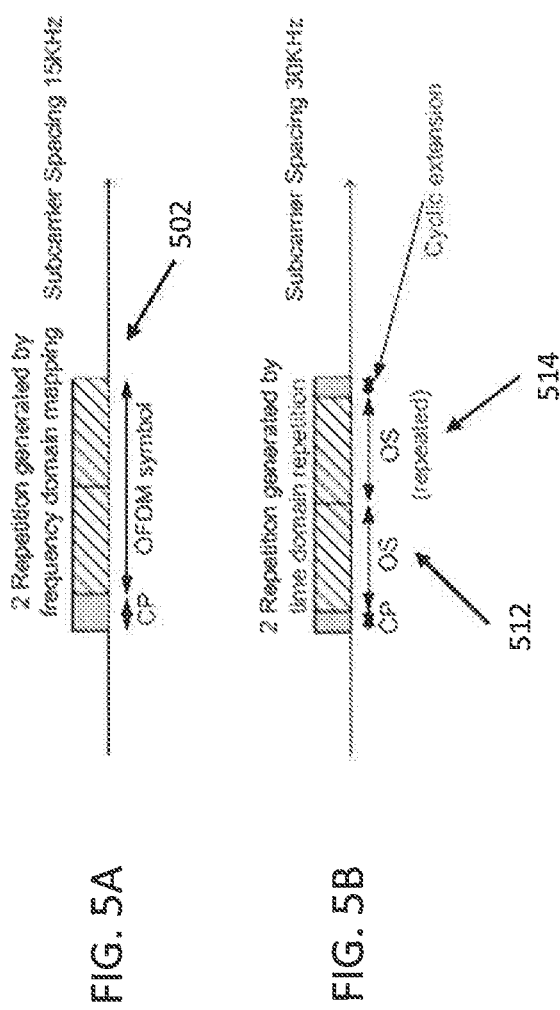
FIG. 5A & 5B illustrate exemplary time repetition properties of an OFDM symbol in a system incorporating aspects of the disclosed embodiments.

FIGS. 5A and 5B illustrate exemplary time repetition properties of an OFDM symbol for a small subcarrier spacing and a large subcarrier spacing, respectively. In FIG. 5A the time repetition property resulting from a frequency domain 1-to-X mapping for a small subcarrier spacing value, $\Delta f_1$, which in this example is 15 KHz, is illustrated. The OFDM symbol 502 in FIG. 5A is preceded by the cyclic prefix (CP), and is generated by mapping a synchronization signal sequence to every other resource element for the subcarrier spacing of 15 KHz. FIG. 5A illustrates the 2-repetition property of the OFDM symbol 502.

FIG. 5B illustrates the time repetition operation for a large subcarrier spacing value, which in this example is 30 KHz. To generate a time repetition signal for a large subcarrier spacing value $\Delta f_2$, e.g. 30 KHz, the length-62 PSS sequence is mapped in a localized way, i.e. to every resource element. The generated signal is further repeated in the time domain, as OFDM symbols 512, 514. The first OFDM symbol 512 is generated by mapping a synchronization signal sequence to resource elements where the subcarrier spacing is 30 KHz. A cyclic prefix (CP) precedes the first OFDM symbol 512.

The second OFDM symbol 514 is an immediate repetition of the first OFDM symbol 512. The second OFDM symbol 514 is followed by a cyclic extension (cyclic postfix). FIG. 5B illustrates the two time repetition of the OFDM symbol in the time domain. The signal $S_1$ being the two time repetition of the signal $S_2$ is a time continuous repetition.

In one example, the wireless communication system supports a plurality of subcarrier spacing values of 15/30/60 KHz. The largest subcarrier spacing value is taken as $\Delta f_2$ (60 KHz), where one value, e.g. the smallest value, is selected as $\Delta f_1$ (15 KHz). In this example the repetition factor $N_{SF}=4$. This is advantageous as the same synchronization signal can be generated by mapping a frequency domain synchronization signal sequence to resource elements using more than 2 subcarrier spacing values.

Figure 6:
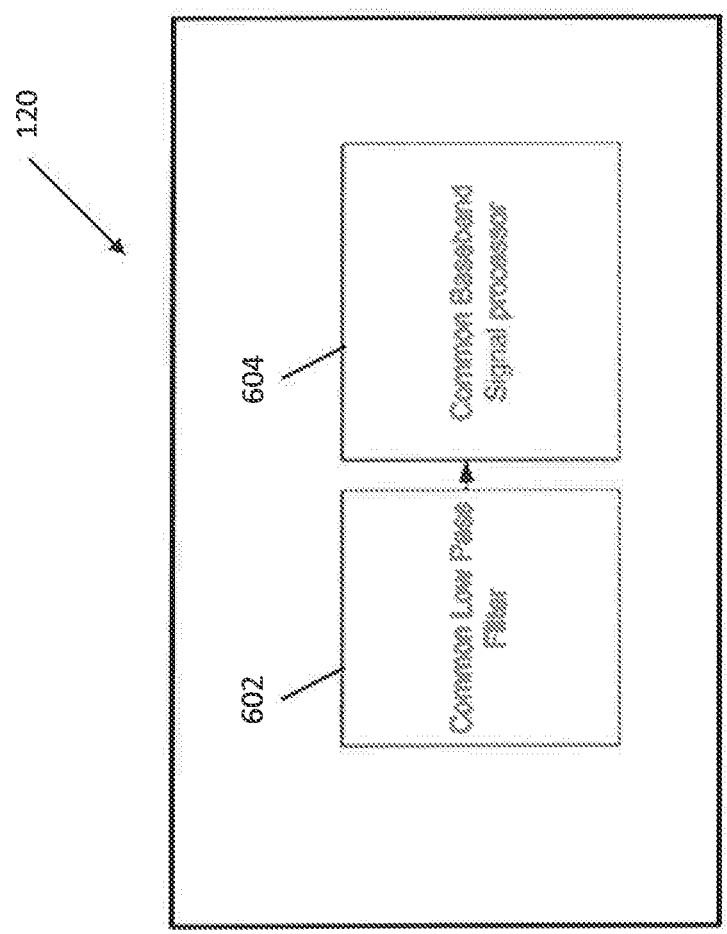
FIG. 6 illustrates a block diagram of an exemplary receiver structure for a system incorporating aspects of the disclosed embodiments.

FIG. 6 generally illustrates an exemplary structure and processing of the synchronization signal $S_1$ that is received at the receiver apparatus 120. Since the synchronization signal $S_1$ is the same in terms of the frequency domain occupancy and the time domain, across different subcarrier spacing values, a common low pass filter 602 and a common baseband signal processor 604 can be used at the receiving apparatus 120 to process the received synchronization signal $S_1$. In one embodiment, the filter 602 and baseband signal processor 604 shown in FIG. 6 can be coupled to or be included in as part of the transceiver 122 and/or processor 124, or the combination thereof, of FIG. 1.

In one embodiment, the filter 602 comprises a baseband filter having a pass band independent (i.e. common) of the subcarrier spacing used for the transmitted synchronization signal $S_1$ and is configured to filter the detected or received synchronization signal $S_1$. After processing by the low pass filter 602, the received synchronization signal $S_1$ is processed by the common baseband signal processor 604. The processor 604 can comprise or include a matched filter where the received samples of the transmitted synchronization signal $S_1$ are multiplied with a replica of the transmitted signal. The time domain repetition factor is independent (i.e. common) of the subcarrier spacing used for the transmitted synchronization signal $S_1$.

The processing by baseband signal processor 604 is typically done in the time domain based on correlation. One typical implementation is a matched filter where the received samples are multiplied with a replica of the transmitted signal.

A typical synchronization signal $S_1$ is designed with good correlation properties. When the received samples r[n] are multiplied with a replica of the transmitted signal, a correlation peak is created at the correct timing: $\rho(\Delta)=\Sigma_{n=0}^{N-1} r[n+\Delta]s^*[n]$. For an incorrect timing the correlation value is significantly lower.

Figure 7:
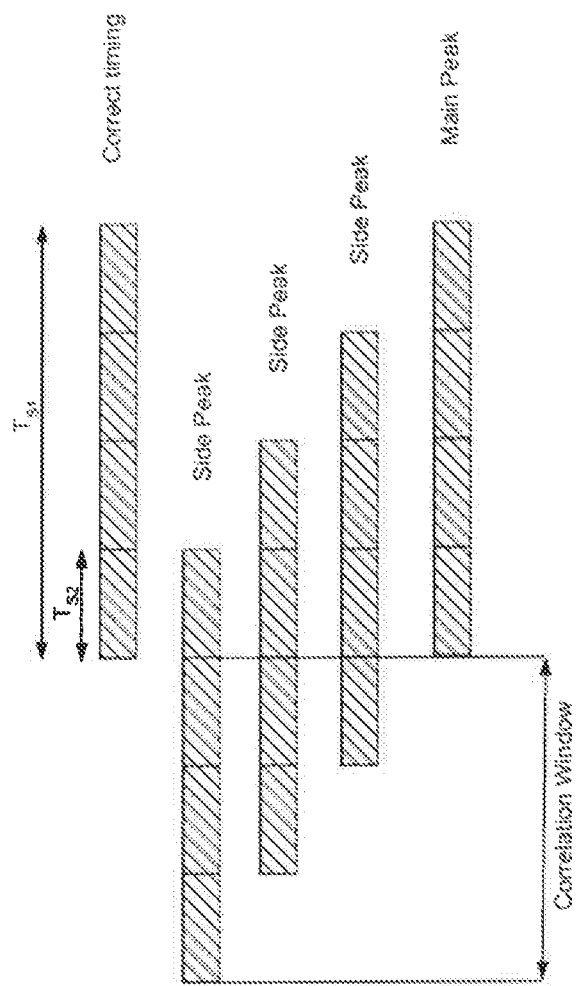
FIG. 7 illustrates exemplary timing information for correlation values in a correlation window of a system incorporating aspects of the disclosed embodiments.

With the time repetition synchronization waveform, the correlation property with only one peak does not hold. There is one main peak P0 at the correct timing, i.e. the received signal waveform completely overlaps with the replica of the transmitted signal. In the meantime, there are $2(N_1-1)$ side peaks at the timing that are partially overlapping. An example of this is illustrated in FIG. 7.

To avoid detecting the side peaks as the main peak, the matched filter shall take into account the correlation values at least in a window not less than $(N_1-1)T_{S2}$, where $T_{S2}$ is the symbol duration corresponding to subcarrier spacing of $\Delta f_2$. The matched filter selects the largest value within this window as the main peak, and the corresponding timing as the timing information.

Figure 8:
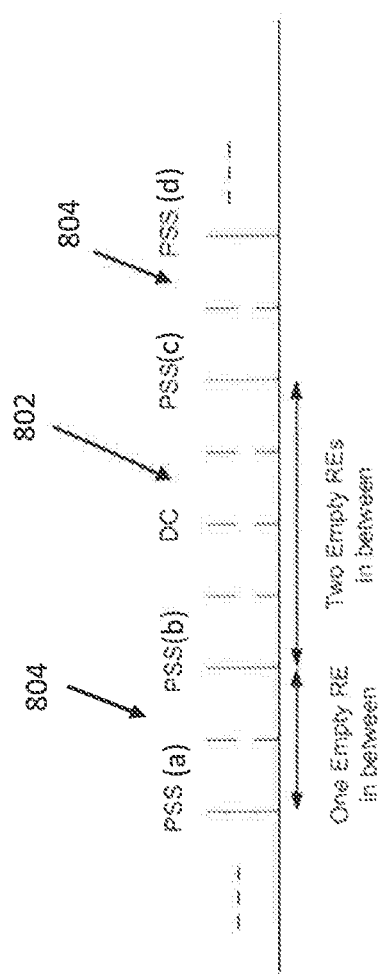
FIG. 8 illustrates an exemplary primary synchronization signal mapping in a system incorporating aspects of the disclosed embodiments.

Referring again to FIG. 3A and also Equation (1), it can be observed that the 1-to-$N_1$ mapping is not exactly evenly distributed in the frequency domain. For the specific example of FIG. 3A, the OFDM waveform with Direct Current (DC) subcarrier not mapped, reference 302 illustrates the mapping characterized by $2(N_1-1)$ resource element(s) not mapped between only one pair of two adjacent PSS-mapping resource elements d(30) and d(31). Reference 304 illustrate the mapping characterized by $N_1-1$ resource element(s) not mapped between other pairs of two adjacent PSS-mapping resource element, such as d(29) and d(30). This is further illustrated in FIG. 8. In FIG. 8 there are two empty resource elements in the gap 802 between the central two adjacent resource elements, PSS(b) and PSS(C) while there is one empty resource element in the gap 804 between other adjacent resource elements, such as PSS(a) and PSS(b) or PSS(c) and PSS(d).

The mapping is further generalized by:

$$a_k = d(m), \quad m = 0, \ldots, L-1 \qquad (6)$$
$$k = \begin{cases} N_1(m - L/2) + \Delta, & m = 0, \ldots, L/2 - 1 \\ N_1(m - L/2 + 1) + \Delta, & m = L/2, \ldots, L-1 \end{cases}$$

where L is the synchronization signal sequence length, and $\Delta$ is a positive integer, $N_1$ is a positive integer, which is derived from $\Delta f_2$ and $\Delta f_1$.

Figure 9:
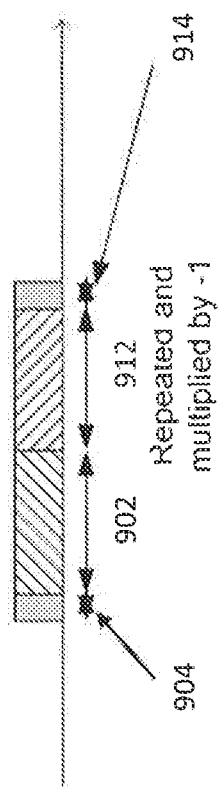
FIG. 9 illustrates an exemplary timing repetition operation of an OFDM symbol in a system incorporating aspects of the disclosed embodiments.

For time domain repetition, the repeated OFDM symbol is different from a normal OFDM symbol, as the repeated OFDM symbol starts with the useful OFDM symbol part rather than a Cyclic Prefix (CP). This ensures that the time domain signal generated for different subcarrier spacings is the same. An example of this is shown in FIG. 9. In this example, the OFDM symbol 902 is repeated as OFDM symbol 912. The signal $S_1$ being the 2 time repetition of the signal $S_2$ is a time continuous repetition.

The signal between the end of useful OFDM symbol 912 and the start of the next OFDM symbol can be generated using a cyclic extension 914 (or cyclic postfix) of the useful OFDM symbol 912 to avoid inter-carrier interference (ICI). In addition, the useful information part in the OFDM symbol of the repeated OFDM symbol (starting with the useful OFDM symbol 912 and followed by the cyclic extension/cyclic postfix 914) is different with normal OFDM symbols (starting with CP 904 and followed by the useful OFDM symbol 902). Different useful OFDM symbol positions enable the receiving apparatus 120 to detect the subcarrier spacing.

For time domain repetition, the repeated OFDM symbol can be manipulated in a pre-configured way. This can be understood as that the subcarrier spacing information is encoded by the repetition. Any form of a synchronization signal generated from the previous OFDM symbol for synchronization signal can be regarded as "repeated". One example is that the repeated OFDM symbol 912 is generated using the first symbol 902 multiplied by a specific value known by both the transmitting apparatus 110 and receiving apparatus 120, e.g. −1, as illustrated in FIG. 9. Different time domain repetition for different subcarrier spacing values enables the receiving apparatus 120 to detect the subcarrier spacing.

In one example, for the OFDM based waveform using the subcarrier spacing $\Delta f_2$, the signal $S_1$ being the $N_{SF}$ time repetition of the signal $S_2$ is a time discontinuous repetition, e.g. there is a cyclic prefix between the signal $S_2$ and a repetition of the signal $S_2$. This means the cyclic prefix is also repeated, which produces a different property in terms of the useful OFDM symbol time positions for the signal $S_1$ across different subcarrier spacing values. This is advantageous as the subcarrier spacing values can be detectable.

In one embodiment, the carrier is divided into several subbands, where each subband corresponds to a subband specific subcarrier spacing value to which a synchronization signal sequence is mapped. A subband specific synchronization allows the receiving apparatus 120 to access the channel on a subband basis, which may further simplify the operation of the receiving apparatus 120. For example in this case, the receiving apparatus 120 can operate with the specific subband bandwidth instead of the entire downlink bandwidth.

Figure 10:
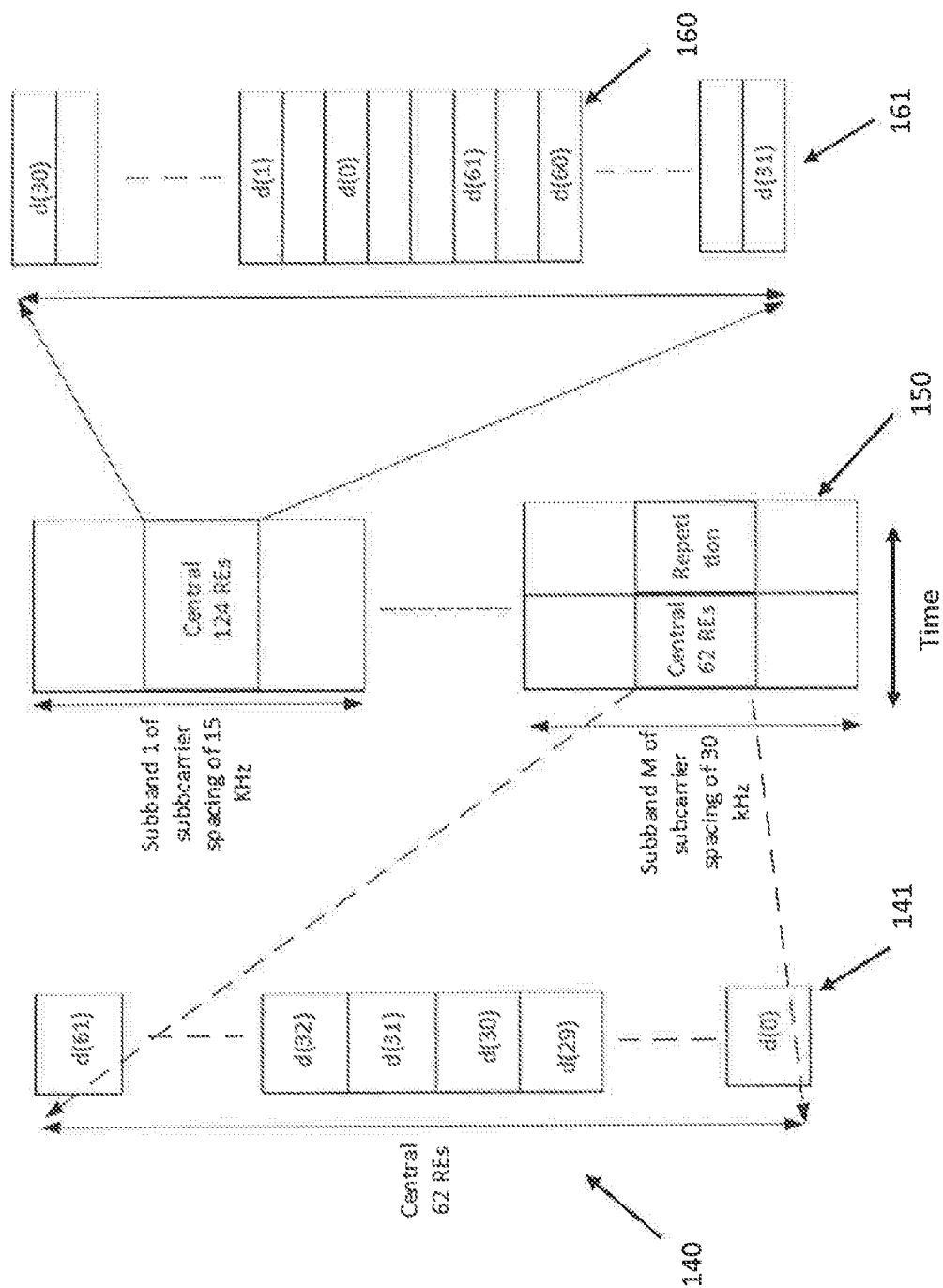
FIG. 10 illustrates an exemplary frequency domain mapping for different subcarrier spacing values in a system incorporating aspects of the disclosed embodiments.

An example of this is shown in FIG. 10, which illustrates one example of frequency domain mapping for different subcarrier spacing values. In this example, for a subband M with a larger subcarrier spacing $\Delta f_2$, e.g. 30 KHz, a same length-L synchronization signal sequence 141 is mapped 140 to every resource element d(0)-d(61) in a localized way, and repeats 150 in the time domain for $N_{SF}$ times.

For the subband 1 shown in the top portion of FIG. 10, with a small subcarrier spacing value $\Delta f_1$, e.g. 15 KHz, a length-L synchronization signal sequence 161 is mapped 160 to every other RE. For each synchronization sequence, the corresponding time domain repetition property, referring to equations 4a and 4b above, is applicable.

Figure 11:
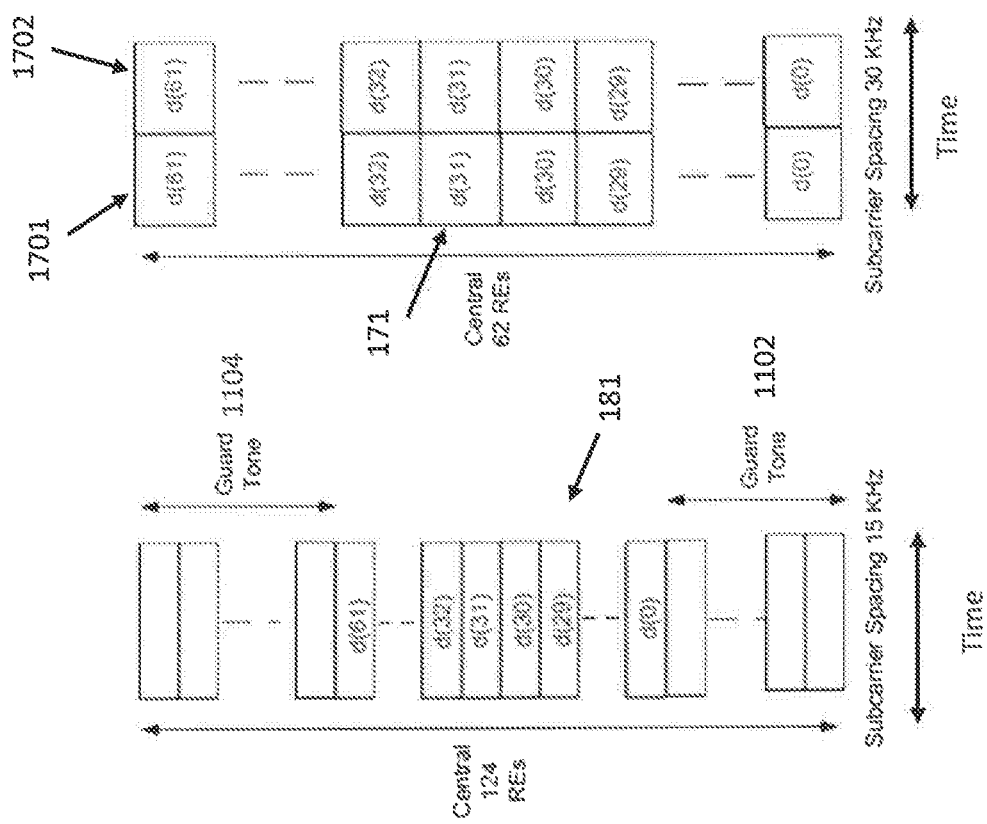
FIGS. 11A and 11B illustrate exemplary frequency domain mapping for different subcarrier spacing values in a system incorporating aspects of the disclosed embodiments.

Referring to FIGS. 11A and 11B, in one embodiment, the subcarrier spacing is specific to the synchronization signal $S_1$. In this embodiment, the synchronization signal $S_1$ is the same in terms of the frequency domain occupancy and the time domain occupancy. However, the time domain signal is different across different subcarrier spacing values.

FIG. 11A illustrates a large subcarrier spacing value $\Delta f_2$, e.g. 30 KHz, where the same length-L synchronization signal sequence 171 is mapped to every RE d(0)-d(61) in a localized way. The resulting synchronization signal 1701 also repeats 1702 in the time domain for $N_{SF}$ times.

Referring to FIG. 11B, for a small subcarrier spacing value $\Delta f_1$, e.g. 15 KHz, a length-L synchronization signal sequence 181 is mapped to every RE d(0)-d(61) in a localized way. To ensure the same bandwidth occupancy as the case for the larger subcarrier spacing $\Delta f_2$, guard tones 1102, 1104 are added before and after the length-L synchronization signal sequence 181. The number of REs for the guard tones 1102, 1104 is at least $(N_{SF}-1)L$.

In the example of FIGS. 11A and 11B, the frequency domain and the time domain occupancy is the same for both subcarrier spacing values $\Delta f_1$, and $\Delta f_2$. For subcarrier spacing $\Delta f_2$ of 30 KHz, the time domain synchronization signal $S_1$ is two repetitions of a basic waveform $S_2$, while for subcarrier spacing $\Delta f_1$ of 15 KHz, the time domain synchronization signal $S_1$ is generally not a repetition of a basic waveform $S_2$. Therefore the time domain waveform is subcarrier spacing specific, while the time domain repetition property holds at least for the carrier or subband corresponding to one subcarrier spacing value, e.g. 30 KHz.

At the receiving apparatus 120 a common low pass filter, such as filter 602 of FIG. 6, can be used to detect the synchronization signal $S_1$. The same length time signal can be used for different subcarrier spacing values, which simplifies the receiver implementation. The time domain signal is different for two cases, which allows the receiving apparatus 120 to detect the subcarrier spacing using the time domain signal. This also allows an LTE UE to properly detect the synchronization signal when the eNodeB is transmitting using LTE subcarrier spacing, e.g. 15 KHz. The UE may use a LTE-compatible low pass filter.

Figure 12:
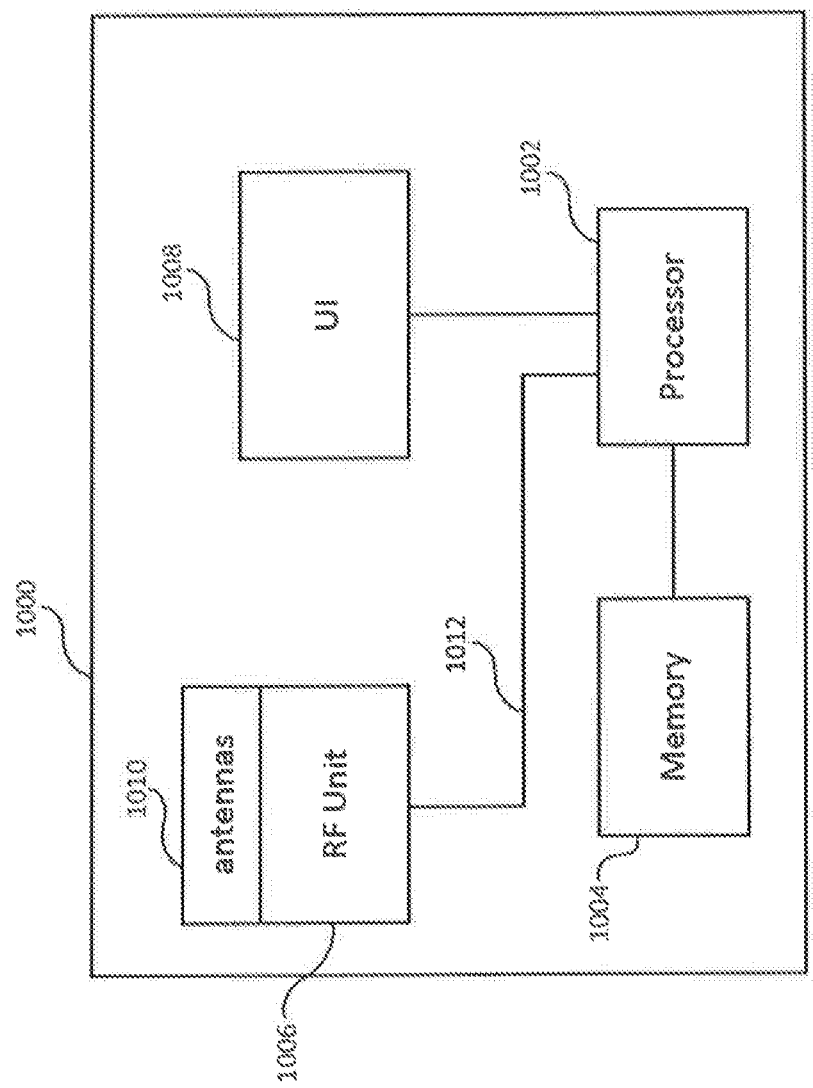
FIG. 12 illustrates a schematic block diagram of an apparatus architecture that can be used to practice aspects of the disclosed embodiments.

FIG. 12 illustrates a block diagram of an exemplary transceiver apparatus 1000 appropriate for implementing aspects of the disclosed embodiments. The transceiver apparatus 1000 is appropriate for use in a wireless network and can be implemented in one or more of the transmitting apparatus 110 or receiving apparatus 120, such as for the transceiver 114 and/or transceiver 122. The transceiver apparatus can be implement in one or more of a network node or a user node, where user node can include various types of mobile computing devices, including various types of wireless communications user equipment such as cell phones, smart phones, tablet devices, and wirelessly connected automobiles. Alternatively the transceiver apparatus 1000 may be configured in or as an access node or base station in a wireless communication network.

The transceiver apparatus 1000 includes or is coupled to a processor or computing hardware 1002, a memory 1004, a radio frequency (RF) unit 1006 and a user interface (UI) 1008. In certain embodiments such as for an access node or base station, the UI 1008 may be removed from the transceiver apparatus 1000. When the UI 1008 is removed the transceiver apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002, which can be implemented as one or more of the processors 112 and 124 described with respect to FIG. 1, may be configured to implement any of the methods described herein.

In the example of FIG. 12, the processor 1002 is configured to be coupled to a memory 1004 which may be a combination of various types of volatile and non-volatile computer memory such as for example read only memory (ROM), random access memory (RAM), magnetic or optical disk, or other types of computer memory. The memory 1004 is configured to store computer program instructions that may be accessed and executed by the processor 1002 to cause the processor 1002 to perform a variety of desirable computer implemented processes or methods such as the methods as described herein.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The transceiver 1000 can also include an RF Unit 1006 coupled to the processor 1002 that is configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming. The antenna unit 1010 of FIG. 10 can be implemented as one or more of the antenna unit 102 or the antenna unit 106 shown in FIG. 1.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

The aspects of the disclosed embodiments are directed to providing a synchronization signal which can be transmitted on a carrier, such as a new radio carrier, where the carrier is capable of multiple subcarrier spacing values. The synchronization signal generation method generally described herein advantageously provide for the same bandwidth for a synchronization signal for different subcarrier spacing values, which allows the detector to use one unified low pass filter. The synchronization signal generation method described herein provides the same synchronization signal sequence for different subcarrier spacing values, which simplifies both the detector and the transmitter. The synchronization signal generation method described herein provides the same synchronization signal in the time domain for different subcarrier spacing values, which allows the detector to share the same matched filter and therefore reduces the receiver complexity. The synchronization signal generation method described herein also provides the same subcarrier spacing for the synchronization signal and the other physical channels/signals multiplexed in the same carrier or the same subband, which avoids ICI and simplifies the transmitter implementation.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosed disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

According to another embodiment, a method in a receiving apparatus for a wireless communication system, the wireless communication system including an OFDM based waveform corresponding to a plurality of pre-defined subcarrier spacing values comprising at least a first subcarrier spacing value $\Delta f_1$ and at least a second subcarrier spacing value $\Delta f_2$, the method comprising:

receiving a symbol; and detecting a signal $S_1$ comprising a $N_{SF}$ time repetition of a signal $S_2$ from the symbol, wherein a duration of the signal $S_2$ is $1/\Delta f_1$, and $N_{SF}=\Delta f_2/\Delta f_1$ is an integer greater than 1.

What is claimed is:

1. A transmitting apparatus for a wireless communication system, the wireless communication system including an Orthogonal Frequency Division Multiplexing (OFDM) based waveform corresponding to a plurality of pre-defined subcarrier spacing values comprising at least a first subcarrier spacing value $\Delta f_1$ and at least a second subcarrier spacing value $\Delta f_2$, the transmitting apparatus including: a processor and a transmitter, wherein the processor is configured to:

generate a signal $S_1$ by mapping a synchronization signal sequence to a resource element corresponding to $\Delta f_1$ and two elements of the synchronization signal sequence to two resource elements frequency indexed by $\{k\}$, $\{k+2N_{SF}-1\}$, wherein k is an integer, and wherein one synchronization signal sequence element is mapped to one resource element of $N_{SF}$ resource elements, and wherein $S_1$ comprises a $N_{SF}$ time repetition of another signal $S_2$, and wherein a duration of the another signal $S_2$ is $1/\Delta f_2$, and $N_{SF}=\Delta f_2/\Delta f_1$, and wherein $N_{SF}$ is an integer greater than 1; and wherein the transmitter is configured to transmit a symbol comprising $S_1$.

2. The transmitting apparatus according to claim 1, wherein the processor is further configured to derive a subcarrier spacing value from the plurality of pre-defined subcarrier spacing values, wherein the subcarrier spacing value comprises: the first subcarrier spacing value $\Delta f_1$, or the second subcarrier spacing value $\Delta f_2$, or a third subcarrier spacing value $\Delta f_3$, wherein the subcarrier spacing value is for transmission of the symbol comprising $S_1$ using the OFDM based waveform.

3. The transmitting apparatus according to claim 1, wherein a duration of the signal $S_1$ is $1/\Delta f_1$.

4. The transmitting apparatus according to claim 1, wherein the second subcarrier spacing $\Delta f_2$ is a largest value of the plurality of subcarrier spacing values.

5. The transmitting apparatus according to claim 1, wherein the processor is configured to generate the signal $S_1$ with a cyclic postfix.

6. The transmitting apparatus according to claim 1, wherein the processor is configured to generate the signal $S_2$ by mapping a synchronization signal sequence to a plurality of frequency continuously indexed resource elements corresponding to $\Delta f_2$.

7. The transmitting apparatus according claim 1, wherein the processor is configured to generate the signal $S_1$ within a subband in a carrier for synchronization, wherein there are a plurality of subbands in the carrier and each subband corresponds to the signal $S_1$.

8. The transmitting apparatus according to claim 1, wherein the processor is configured to generate a signal $S_3$ by mapping a synchronization signal sequence length L to resource elements corresponding to $\Delta f_1$ with at least ($N_{SF}$−1)L resource elements reserved, where L is a positive integer.

9. The transmitting apparatus according to claim 1, wherein the signal $S_1$ is for synchronization.

10. A receiving apparatus for a wireless communication system, the wireless communication system including an Orthogonal Frequency Division Multiplexing (OFDM) based waveform corresponding to a plurality of pre-defined subcarrier spacing values comprising at least a first subcarrier spacing value $\Delta f_1$ and at least a second subcarrier spacing value $\Delta f_2$, the receiving apparatus including: a processor and a receiver, wherein the receiver is configured to receive a symbol comprising a signal, and wherein the processor is configured to:
    detect a signal $S_1$ comprising a $N_{SF}$ time repetition of a signal $S_2$ from the symbol, wherein a duration of the signal $S_2$ is $1/\Delta f_1$, and $N_{SF}=\Delta f_2/\Delta f_1$, wherein $N_{SF}$ is an integer greater than 1, wherein the signal $S_1$ is generated by mapping a synchronization signal sequence to a resource element corresponding to $\Delta f_1$ and two elements of the synchronization signal sequence to two resource elements frequency indexed by {k}, {k+2$N_{SF}$−1}, wherein k is an integer, and wherein one synchronization signal sequence element is mapped to one resource element of $N_{SF}$ resource elements.

11. The receiving apparatus according to claim 10, wherein the signal $S_1$ is for synchronization and the processor derives synchronization information from detecting the signal $S_1$.

12. The receiving apparatus according to claim 10, wherein the processor derives a subcarrier spacing value used for transmission of the symbol.

13. A method implemented by a transmitting device of a wireless communication system, the wireless communication system including an Orthogonal Frequency Division Multiplexing (OFDM) based waveform corresponding to a plurality of pre-defined subcarrier spacing values comprising at least a first subcarrier spacing value $\Delta f_1$ and at least a second subcarrier spacing value $\Delta f_2$, the method comprising:
    generating a signal $S_1$ by mapping a synchronization signal sequence to a resource element corresponding to $\Delta f_1$ and two elements of the synchronization signal sequence to two resource elements frequency indexed by {k}, {k+2$N_{SF}$−1}, wherein k is an integer, and wherein one synchronization signal sequence element is mapped to one resource element of $N_{SF}$ resource elements, and wherein $S_1$ comprises a $N_{SF}$ time repetition of an another signal $S_2$, and wherein a duration of the another signal $S_2$ is $1/\Delta f_2$, and $N_{SF}=\Delta f_2/\Delta f_1$, and wherein $N_{SF}$ is an integer greater than 1; and
    transmitting a symbol comprising $S_1$.

14. The method according to claim 13, further comprising:
    deriving a subcarrier spacing value from the plurality of pre-defined subcarrier spacing values, wherein the subcarrier spacing value comprises: the first subcarrier spacing value $\Delta f_1$, or the second subcarrier spacing value $\Delta f_2$, or a third subcarrier spacing value $\Delta f_3$, wherein the subcarrier spacing value is for transmission of the symbol comprising $S_1$ using the OFDM based waveform.

15. The method according to claim 13, wherein a duration of the signal $S_1$ is $1/\Delta f_1$.

16. The method according to claim 13, wherein the second subcarrier spacing $\Delta f_2$ is a largest value of the plurality of subcarrier spacing values.

* * * * *